United States Patent [19]

Taft et al.

[11] Patent Number: 4,986,394
[45] Date of Patent: Jan. 22, 1991

[54] BRAKE ACTUATOR

[75] Inventors: Philip A. Taft, Cheswick Green; Michael D. Knight, Birmingham, both of Great Britain

[73] Assignee: Lucas Industries, Birmingham, England

[21] Appl. No.: 535,985

[22] Filed: Jun. 8, 1990

Related U.S. Application Data

[63] Continuation of Ser. No. 66,501, Jun. 26, 1987, abandoned.

[30] Foreign Application Priority Data

Jun. 26, 1986 [GB] United Kingdom ................ 8615623

[51] Int. Cl.$^5$ ............................................. B60T 11/06
[52] U.S. Cl. ...................................... 188/364; 74/110; 92/69 R; 92/136; 188/217; 188/331; 188/370; 192/94; 192/100
[58] Field of Search .................... 188/364, 72.5, 370, 188/196 V, 196 D, 327, 328, 331, 363, 346, 217, 204 R; 192/94, 100; 74/110; 92/68, 69 R, 69 AB, 70, 136

[56] References Cited

U.S. PATENT DOCUMENTS

| 28,881 | 6/1976 | Farr | 188/196 D |
|---|---|---|---|
| 317,306 | 5/1885 | Cooper | 192/94 X |
| 2,100,488 | 11/1937 | Rasmussen | 188/364 X |
| 2,130,875 | 9/1938 | Colman | 188/364 X |
| 2,741,338 | 4/1956 | Taylor | 188/196 B |
| 2,876,751 | 3/1959 | Kolthoff, Jr. | 92/69 R X |
| 2,949,173 | 8/1960 | Peras | 188/196 D |
| 3,601,233 | 8/1971 | Marschall et al. | 188/196 D X |
| 3,744,595 | 7/1973 | Adams | 188/331 X |
| 3,750,853 | 8/1973 | Farr | 188/217 X |
| 3,763,747 | 10/1973 | Beichel et al. | 74/110 X |
| 3,838,757 | 10/1974 | Farr | 188/196 D X |
| 4,071,123 | 1/1978 | Courbot et al. | 188/331 |
| 4,360,325 | 11/1982 | Galloway | 74/110 X |
| 4,442,930 | 4/1984 | Montalvo, Sr. | 92/136 X |
| 4,537,293 | 8/1985 | Osborne | 188/364 X |
| 4,702,354 | 10/1987 | Ingram et al. | 188/196 D |

FOREIGN PATENT DOCUMENTS 1476922 6/1977 United Kingdom ........... 188/196 D

*Primary Examiner*—George E. A. Halvosa
*Attorney, Agent, or Firm*—Staas & Halsey

[57] ABSTRACT

A brake actuator has a body containing a pair of brake-applying members which may be actuated hydraulically to separate the friction elements of a brake into engagement with a rotatable braking surface. The members are interconnected by a mechanism in the form of a shaft of which respective end portions are provided with reversible threaded portions of opposite hand which engage corresponding threads within the members, the shaft being constrained against axial movement between bearings. Any excess movement of one of the members relative to the other is transmitted to that other member such as to cause an opposite and proportional force on the other member to substantially equalize the wear rates on the friction elements.

7 Claims, 1 Drawing Sheet

BRAKE ACTUATOR

This is a continuation of copending application Ser. No. 07/066,501 filed on June 26, 1987, now abandoned.

BACKGROUND OF THE INVENTION

This invention relates to a brake actuator intended for use primarily, although not exclusively, with an internal shoe drum brake of the leading/trailing type, usually known as a simplex brake.

One characteristic of drum brakes is that they operate with a degree of self-energization or servo derived from the rotating brake drum and this tends to increase the braking force on the leading shoe and reduce the braking force on the trailing shoe, as is well understood. A result of this is that the friction material of the leading shoe wears away at a faster rate than that of the trailing shoe with consequent inconvenience to users in terms of servicing requirements.

A proposal to deal with the unequal wear problem is illustrated in British Patent No. 456238. This provides the trailing shoe with an automatic adjuster device coupled by a flexible drive element to the leading shoe so that adjustment is applied in equal amounts to both shoes. Although this partially corrects the unequal wear, the aforesaid characteristic of unequal braking forces at the respective shoes, which gives rise to the unequal wear, remains unchanged.

Another partial solution to the problem has been attempted by using friction linings of different thickness on the leading and trailing shoes, but this again deals with the effect of the problem rather than its fundamental cause and results in the inconvenience of "handed" shoes.

In a further prior proposal, a hydraulic actuator is provided with opposed pistons having different working areas, the pistons being arranged so that the larger actuating force is applied to the trailing shoe. Whilst this can in theory balance the forces applied respectively to the leading and trailing shoes, it is not entirely satisfactory because the geometry of the brake varies during use and it is difficult in practice to match the forces to the theoretical ideal.

SUMMARY OF THE INVENTION

An object of the present invention is to provide an improved brake actuator which enables actuating forces to be applied to the braking elements of a brake in a more balanced manner than hitherto.

According to the present invention, a brake actuator comprises a body carrying a pair of brake-applying members operable, in use, to separate friction elements into braking engagement with a rotatable braking surface, said members being interconnected by mechanism which acts to transmit any excess forced to be applied to one member relative to the other to that other member such as to cause an opposite proportional movement of said other member.

In one convenient arrangement, the brake-applying members are threadedly engaged with respective oppositely handed threaded portions of a shaft mounted for rotation but axially constrained relative to said body, whereby said excess movement of one member tends to cause rotation of the shaft and transmit a proportional and opposite force to the other member.

Typically, axial constraint of the shaft is afforded by opposed faces of a flange of the shaft reacting, preferably by way of anti-friction bearings, against adjacent opposed faces fixed relative to the housing.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
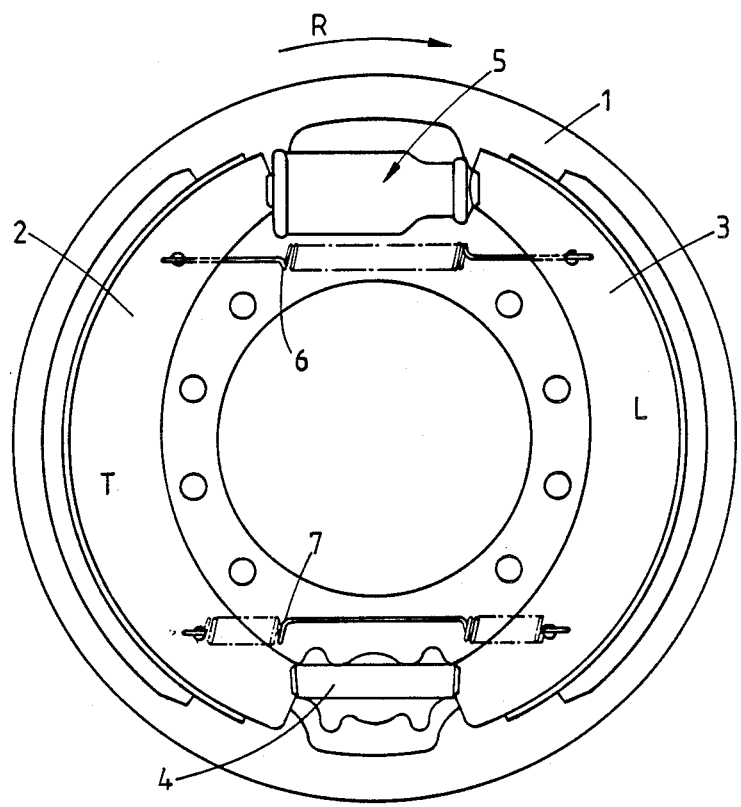
FIG. 1 is an end elevation of an internal shoe drum brake incorporating an actuator in accordance with the invention.
Figure 2:
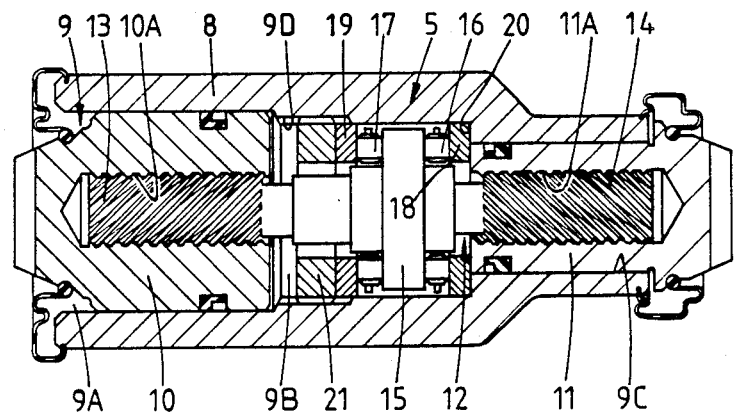
FIG. 2 is a longitudinal cross-section of the actuator of the brake of FIG. 1.

The brake illustrated in FIG. 1 has a back plate 1 upon which are mounted a pair of brake shoes 2 and 3, of which one pair of adjacent shoe ends engages a fixed abutment 4 secured to the back plate. An actuator 5 is fixed to the back plate between the other pair of adjacent shoe ends and is operable to expand the shoes 2 and 3 into braking engagement with a rotatable brake drum (not shown) against the action of shoe return springs 6 and 7. Because only one pair of shoe ends is actuated, the brake acts in a leading/trailing configuration and, for a direction of drum rotation indicated by the arrow R, the shoe designated L will act as the leading shoe and that designated T acts as the trailing shoe. A conventional brake of this type is subject to the disadvantages enumerated above and these are alleviated by the actuator of the invention which will now be described in more detail with reference to FIG. 2 of the drawings.

The actuator 5 comprises a body 8 having a through bore 9 which is stepped at two locations to form a larger diameter bore portion 9A, an intermediate bore portion 9B and a smaller diameter bore portion 9C. The bore portions 9A and 9C contain respective tappets in the form of hydraulic pistons 10 and 11, of which the piston 10 has a larger cross-sectional area subjected to hydraulic fluid pressure than the piston 11, the piston 10 engaging and actuating the shoe 2 and the piston 11 engaging and actuating the shoe 3 (FIG. 1). The pistons are hollow and provided with internal reversible threads 10A, 11A respectively of opposite hand and the pistons are interconnected by a shaft, indicated generally at 12, the shaft being provided with oppositely extending threaded portions 13, 14 corresponding to and engaged with the respective threads in the pistons. The shaft 12 is provided with a central radially extending flange 15, the oppositely facing surfaces of which are engaged respectively with roller bearings 16, 17 which also bear against respective relatively fixed hardened inserts 18, 19. The insert 18 abuts a shoulder 20 formed by the step in the cylinder which forms the smaller diameter bore portion 9C and the intermediate bore portion 9B has an internally threaded portion 9D which receives an externally threaded nut member 21 surrounding the shaft and acting to urge the assembly of the shaft 12, bearings 16, 17 and hardened inserts 18, 19 firmly into engagement with the shoulder 20 in order to constrain the shaft 12 against axial movement relative to the body 5 whilst at the same time permitting rotation of the shaft by way of the bearings 16, 17.

In order to actuate the brake, hydraulic fluid under pressure is supplied to the intermediate bore portion 9B and urges the pistons 10 and 11 in opposite directions outwardly of the body to expand the brake shoes 2 and 3. Because of the interconnection between the pistons provided by the oppositely handed reversible threads of the pistons and shaft 12, axial movement of the two pistons will tend to rotate the shaft.

However, since the brake has a leading/trailing configuration, the wear rate of the leading shoe actuated by the piston 11 may be greater than that of the shoe 2 and an excess of movement of the piston 11 relative to the piston 10 will then be necessary in order to apply the worn leading shoe against the drum. This excess movement will tend to cause rotation of the shaft 12 to transmit an opposite and proportional force to the piston 10. Any additional force arising on the leading shoe as a result of the servo effect of the drum on that shoe is transmitted, by rotation of the shaft 12 or the tendency of the shaft to rotate, to the trailing shoe, supplementing the actuating force on that shoe. The wear rates of the leading and trailing shoes are thereby substantially equalized so that the necessity for the various compensatory practices which have hitherto been necessary is largely obviated.

Although in the embodiment described the pistons 10 and 11 are of unequal diameters, it will be understood that equal diameter pistons may be employed and means alternative to the shoulder 20 will then be necessary to restrain the shaft 12 against axial movement. Such means, could, for example, be an additional nut equivalent to the nut 21 disposed at the opposite side of the flange 15 and engaging a corresponding thread in the housing. It would be possible to provide the external surface of the flange 15 with a worm or other suitable formation for engagement with a pinion for example to enable the shaft to be rotated manually. This arrangement could be particularly important when, in accordance with another alternative embodiment, at least one of the pistons is provided with automatic adjustment means to compensate for shoe wear in conventional manner. The rollers 16 and 17 may be replaced by other low friction devices such as washers provided with a low friction coating, for example.

For the majority of applications of the invention, the compensatory effect of the connecting mechanism on the tappet which moves least will be equal to the excess movement of the other tappet. The nature of the mechanism could, however, be varied to produce a greater or less compensatory effect, as required. In the case of the mechanism described having oppositely-handed threads, the pitch of the respective threads of the two threaded connections at the pistons may be different.

In a further alternative arrangement applicable to a drum brake, a sliding wheel cylinder may be employed, with the cylinder body slidingly mounted on the backplate and engaging one shoe, and a piston slidably mounted in the body and engaging the other shoe. The force-transmitting mechanism, conveniently in the form of a shaft similar to shaft 12 of the illustrated embodiment, may then interconnect the slidable body and piston, whilst being axially constrained by fixed structure, to provide the compensatory effect described above.

It would be possible to incorporate the actuator of the invention in a disc brake in which unequal pad wear problems occur for various reasons. Thus, in the particular example of a reaction-type disc brake in which one pad is directly actuated and the other indirectly actuated by reaction of the directly actuated pad against the disc, in known manner, the force transmitting mechanism, which may be similar to the drive shaft 12, could be disposed between the fixed caliper body containing the actuator piston and the sliding caliper which applies the indirectly actuated pad so that by the action of the oppositely handed threads described above, one of the pads may be screwed outwardly in accordance with the actuating movement of the other pad. The actuator of the invention may also be employed in a frame type disc brake caliper having a fixed body containing opposed actuating pistons, the drive shaft 12 then acting between the opposed pistons.

We claim:

1. A brake actuator comprising a body adapted to be relatively fixed in use, said body having a pair of bores containing respective pistons, each piston partially defining with the body a hydraulic chamber for receiving hydraulic fluid under pressure for moving said pistons outwardly of the body in order to separate friction elements engaged therewith in use into braking engagement with a rotatable braking surface; connecting means rotatably mounted in the body and having a pair of oppositely extending, oppositely handed, reversibly threaded portions which engage respective corresponding threaded portions of the pistons thereby to interconnect the pistons mechanically, the connecting means being axially fixed in the body at a location intermediate the threads, whereby the connecting means rotates freely without transmitting brake-applying force during equal outward brake-applying movement of the pistons under the effect of said fluid pressure, but when one piston is moved outwardly by said hydraulic pressure more than the other piston, this excess movement of said one piston tends to cause rotation of the connecting means via its threaded portion engaged with the connecting means in order to transmit to said other piston an opposite and proportional force.

2. An actuator according to claim 1 wherein axial constraint of the connecting means is afforded by opposed faces of a flange of the connecting means reacting against adjacent opposed faces fixed relative to the body.

3. An actuator according to claim 2 wherein anti-friction bearings are disposed between said flange faces and said flange faces and said fixed faces against which they react.

4. An actuator according to claim 1 wherein said pistons have different cross-sectional areas subjected to hydraulic actuating pressure.

5. An actuator according to claim 1 wherein said bores comprise respective end portions of the body of different internal diameters, the body further including an intermediate portion having a greater diameter than the smaller diameter one of said end portions, said connecting means having a flange disposed within said intermediate body portion and reacting, at one side thereof, against a shoulder formed at the junction between said smaller diameter and intermediate body portions and at its other side against an abutment member screwed into an internally threaded end part of the intermediate body portion remote from said smaller diameter portion.

6. An actuator according to claim 5 wherein anti-friction bearings are disposed between the respective sides of the flange and inserts located respectively against said shoulder and abutment member.

7. An actuator according to claim 1 wherein the pitches of the screw threads of said threaded portions are the same.

* * * * *